United States Patent [19]

Penton

[11] 4,382,179
[45] May 3, 1983

[54] ADDRESS RANGE TIMER/COUNTER

[75] Inventor: Perry W. Penton, Centerville, Ohio

[73] Assignee: NCR Corporation, Dayton, Ohio

[21] Appl. No.: 170,379

[22] Filed: Jul. 21, 1980

[51] Int. Cl.³ .......................... G11B 27/36; G06M 3/06
[52] U.S. Cl. ..................................... 377/20; 364/200; 377/39
[58] Field of Search ........... 235/92 T, 92 MT, 92 SA, 235/92 DP, 92 BD; 364/200, 900

[56] References Cited

U.S. PATENT DOCUMENTS

| | | | |
|---|---|---|---|
| 3,426,331 | 2/1969 | Joyce | 364/200 |
| 4,034,353 | 7/1977 | Denny et al. | 364/200 |
| 4,144,447 | 3/1979 | Fossum et al. | 235/92 T X |
| 4,192,130 | 3/1980 | Takeuchi | 235/92 T |

Primary Examiner—Felix D. Gruber

Attorney, Agent, or Firm—J. T. Cavender; Albert L. Sessler, Jr.; Elmer Wargo

[57] ABSTRACT

A system for measuring program execution time compares all addresses occurring on a memory bus to an upper limit number and a lower limit number to produce a signal which indicates if each address occurring on the memory bus is within a range represented by the upper limit number and the lower limit number. The signal is utilized to either enable incrementing of a counter at a predetermined rate or to increment the counter once for every new address occurring on the memory bus within the range. The contents of the counter represent either the accumulated time of execution of instructions having addresses within the range or the number of instructions executed having addresses within the range. The system includes a display for displaying the contents of the counter.

20 Claims, 14 Drawing Figures

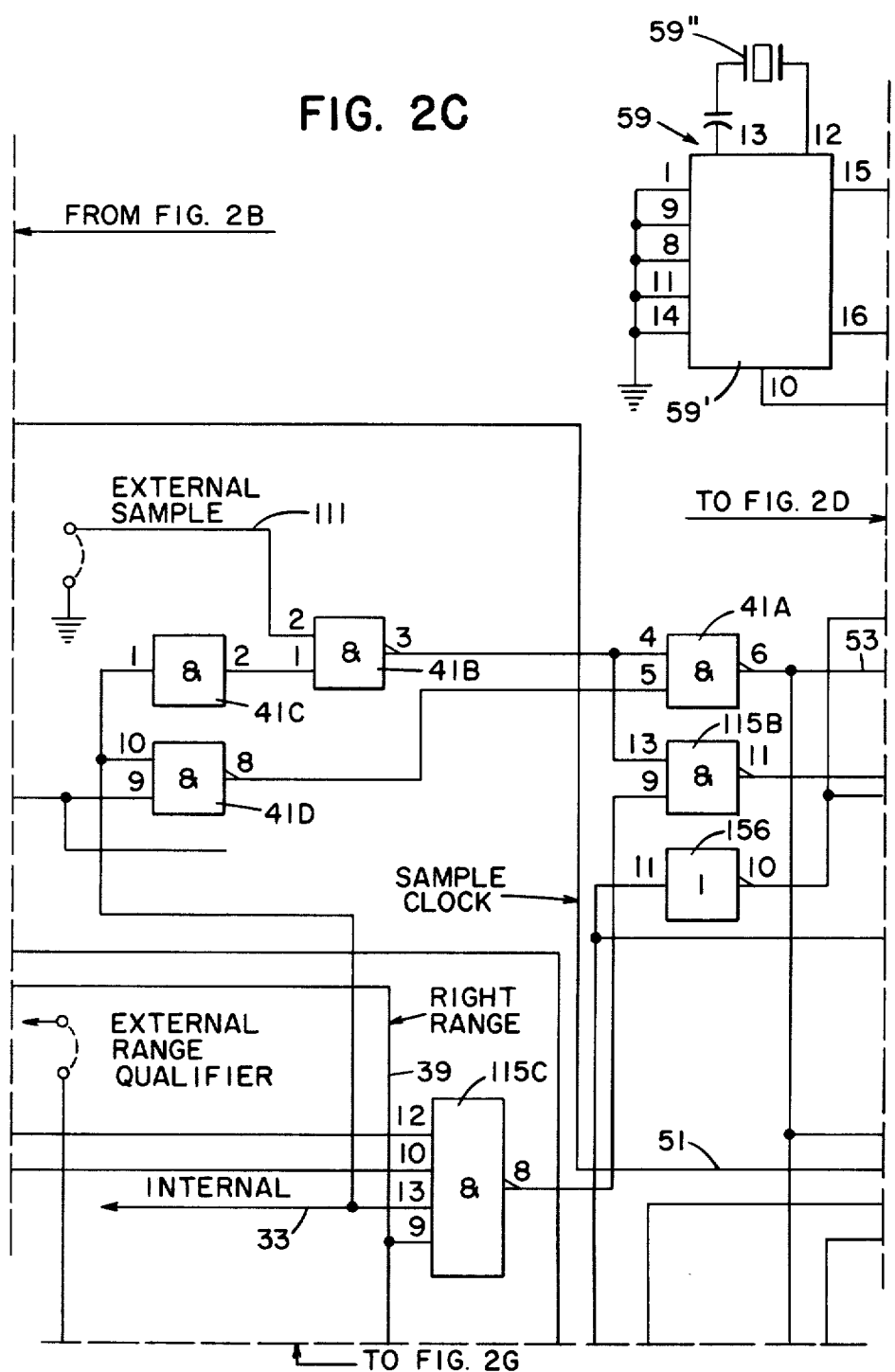

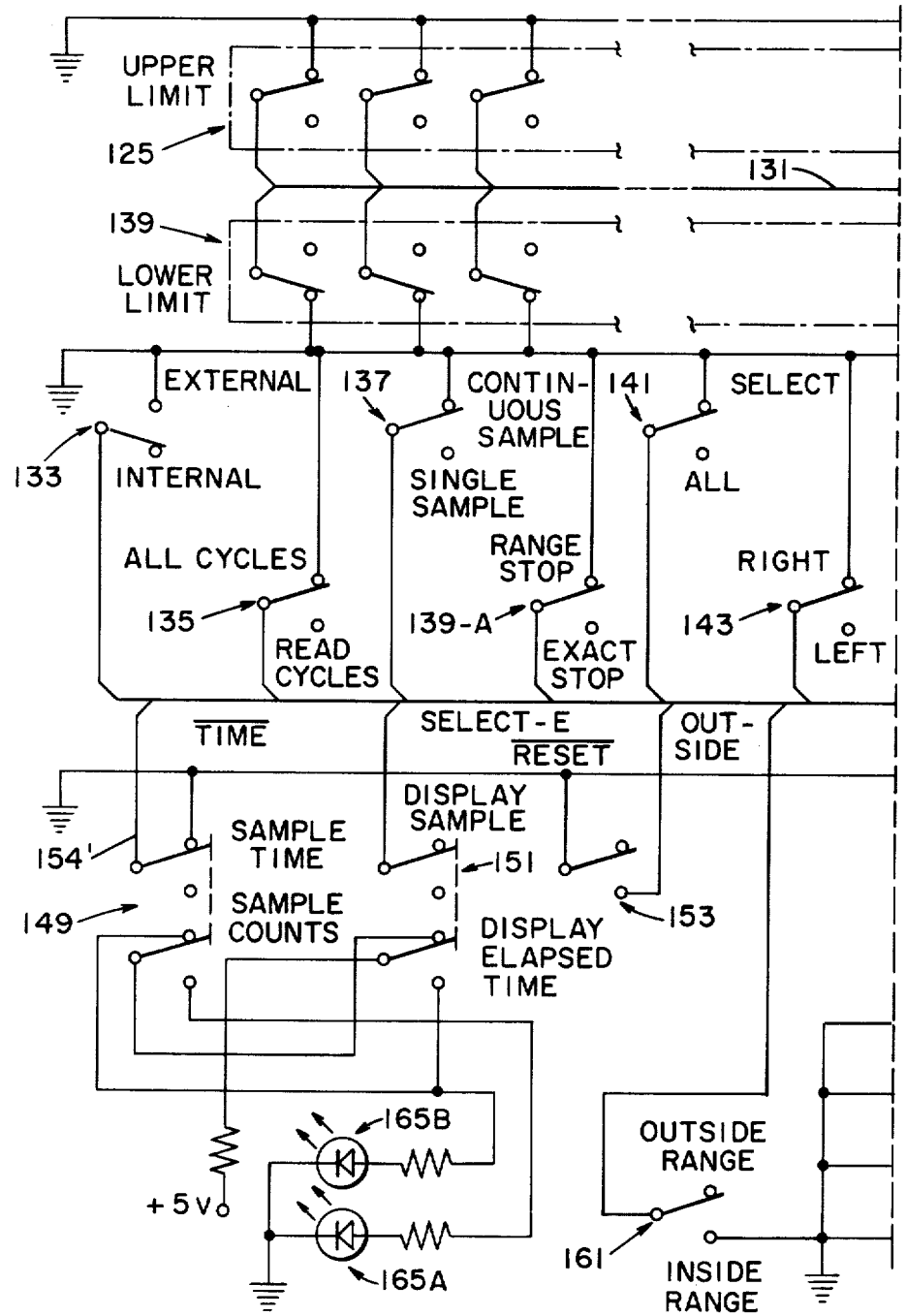

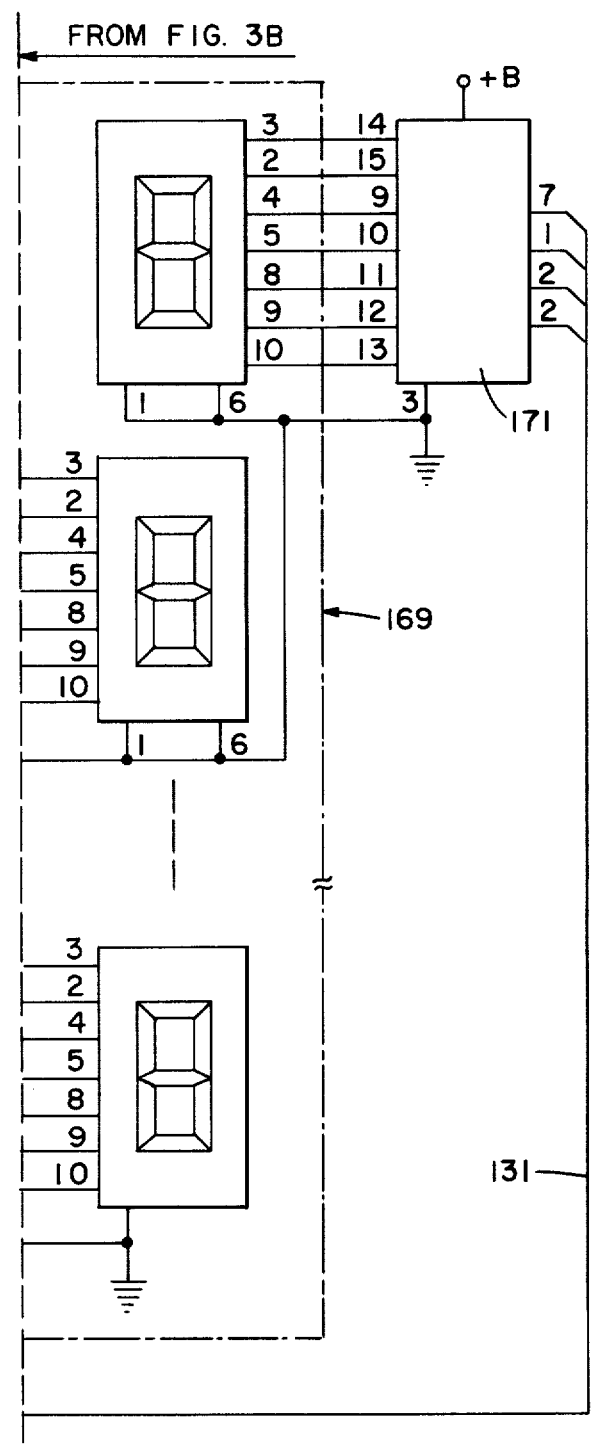

ADDRESS RANGE TIMER/COUNTER

BACKGROUND OF THE INVENTION

1. Field of the Invention

The invention relates to systems and methods for determining the amount of time required for execution of software programs, modules, routines and the like.

2. Description of the Prior Art

As electronic computers and software utilized therewith become increasingly complex and costly, it has become desirable to determine the execution time of individual software modules in order to improve the efficiency and to reduce the cost of developing software systems. The ability to determine the execution time of particular software modules allows more efficient utilization and design of an overall computing system and ultimately provides the user with maximum amount of computation per dollar of cost. One expensive device which is capable of providing an indication of time required for execution of certain groups of software instructions is the Hewlett Packard 1611A data analyzer.

However, that device has the capability of starting a timer upon the occurrence of a particular first memory address and continuing timing until a specified second address is executed. The device has the serious disadvantage that only the total time elapsing between execution of the first address and execution of the second address is measured. That total time may include time required for fetching and executing subroutines which service slow input/output devices, thereby completely obscuring the amount of processor time required to execute a particular software module. Yet it often is the processor time required for execution of a program which is desired to be known.

Another system for measuring software execution time is disclosed in U.S. Pat. No. 3,771,144. However, the system disclosed in U.S. Pat. No. 3,771,144 also has the shortcoming that execution times measured by it may include execution times for subroutines and times required for input and output operations.

Accordingly, it is an object of the invention to provide a system and method for measuring or indicating the amount of time required for execution of particular software modules, exclusive of the time required to execute subroutines.

The system disclosed in U.S. Pat. No. 3,771,144 discloses a complex timing system (for timing intervals) embedded within a software module to be executed, wherein timing hardware specifically dedicated to the timing function is built within the computer system and is actuated with certain conditions met. However, the system disclosed in U.S. Pat. No. 3,771,144 is incapable of being utilized as a software development tool which can be easily and conveniently connected to any operating computer to measure or indicate execution time for a particular software module being executed by the computer without modifying either the hardware or the software of the computer.

Accordingly, it is another object of the invention to provide a system and method for measuring or indicating execution time for software modules being executed by a computer without modifying either the software or hardware of the computer system.

It is another object of the invention to provide a simple, low cost system and method for measuring or indicating execution times of software modules being executed by a computer.

SUMMARY OF THE INVENTION

Briefly described, and in accordance with one embodiment thereof, the invention provides a system and method for measuring execution of instructions being executed by means of addresses being transmitted on a memory bus. In the described embodiment of the invention, an upper limit address and a lower limit address are selected, and either a first range or a second range is selected, the first range including addresses less than the upper limit address and greater than the lower limit address, and the second range including addresses greater than the upper limit address and less than the lower limit address. In operation, an instruction address is coupled from a first memory bus to inputs of first and second digital comparators. The first digital comparator detects whether the instruction address is greater than or less than the upper limit address and the second digital comparator detects whether the instruction address is greater than or less than the lower limit address. The outputs of the first and second digital comparators are operated upon along with a signal representing the selected range to produce a first signal which indicates whether or not the instruction address is in the selected range. In one mode of operation, referred to as the timing mode, a first counter is enabled by the first signal counts to indicate whether the amount of time during which instruction addresses being executed is within the selected range or meets certain other criteria. In another mode, referred to as the counting mode, the first counter is enabled to count the number of such instructions which are within the selected range. In the described embodiment of the invention, the memory bus can be a selected one of several memory buses, the selected memory bus being selected by means of a multiplexer circuit. In the timing mode, wherein the first counter in effect measures time required for instruction execution, the time required for execution of instructions by means of an "on board memory" (which is a memory other than the one in which the instructions whose execution is being measured are stored) can be selectively included or excluded from the time count which is accumulated in the first counter. In a counting mode, wherein the counter counts the number of instructions executed within the range, the counting of instructions executed can be controlled to selectively include either only read cycles, or else all cycles, including read and write cycles. In the timing mode, the measuring can be controlled to begin measurement from the time at which an instruction address first occurs on the memory bus in the selected range and to continue until the occurrence of an instruction address on the memory bus outside of the selected range. Alternatively, the measuring can be controlled to continue until an instruction address is exactly equal to the upper limit address. Further, the system includes circuitry to either cause measurement only of instructions executed by a particular processor, or to cause measurement of all instructions executed by any processor coupled to the selected memory bus. A second counter, referred to as an elapsed time counter, begins counting time when measurement of instructions commences and continues until measurement of instructions ceases, and is also included in the system in order to enable the user to determine the percentage of the total elapsed time which is required for measurement of instruction execution in the timing mode of operation. A display unit selectively displays the contents of either the first counter or the second counter. In the described embodiment of the invention, manual switches are included on a control panel for enabling a user to select the upper and lower limit addresses, the desired range, and the various above described modes of operation. The system of the described embodiment of the invention is utilized as a software development tool which is very useful for obtaining precise amounts of time required for execution of various particular routines, exclusive of time required by other tasks, such as execution of other interrupt routines.

BRIEF DESCRIPTION OF THE DRAWINGS

FIGS. 2A, 2B, 2C, 2D, 2E, 2F, 2G and 2H in combination constitute a detailed logic diagram of a portion of the circuitry of FIGS. 1A, 1B and 1C.

FIGS. 3A, 3B and 3C in combination constitute a partial schematic diagram illustrating the manual control switches and display indicators of a control panel connected to the software timing system of FIGS. 1A and 1B.

DESCRIPTION OF THE INVENTION

Figure 1A:
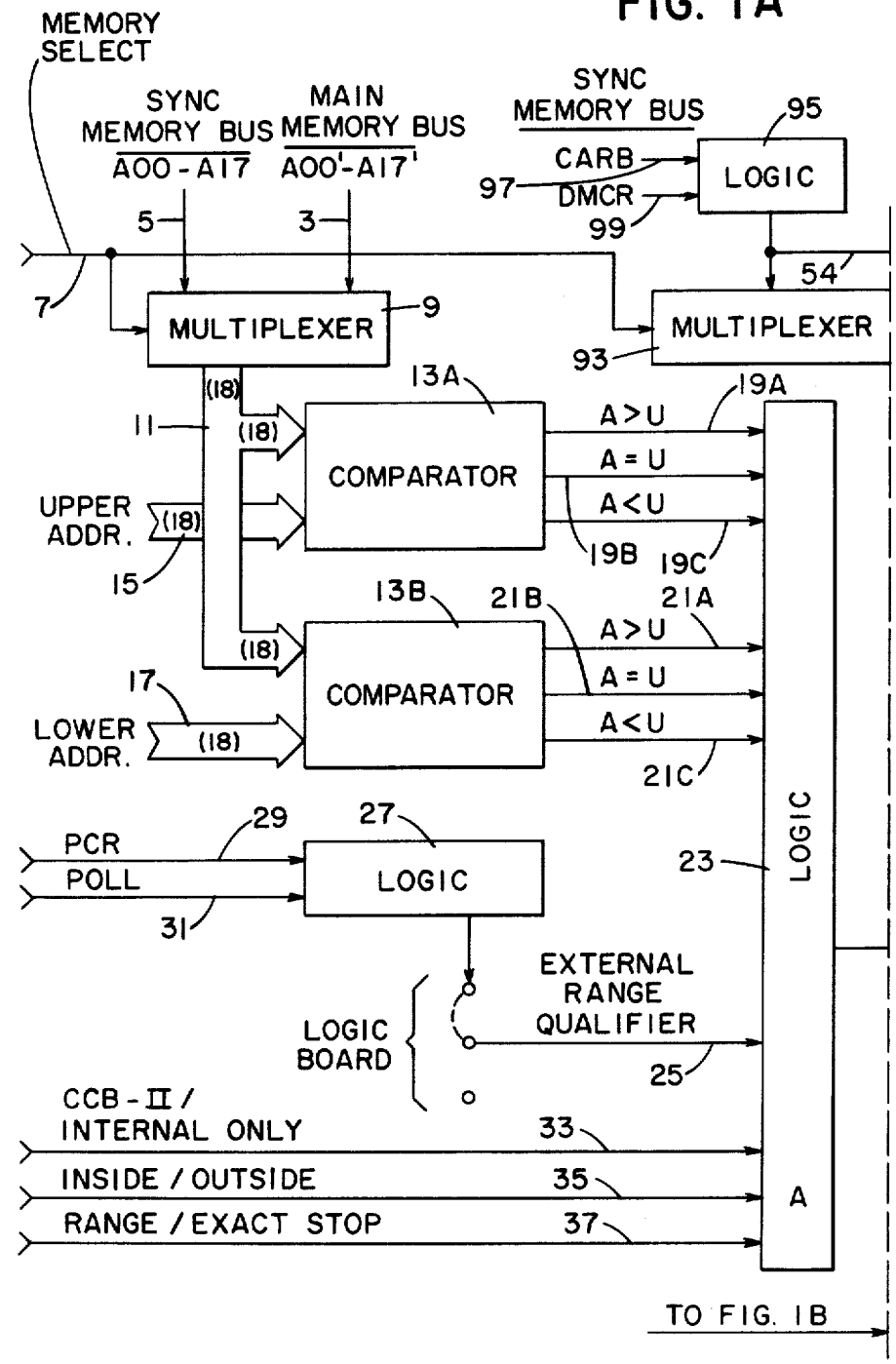
FIGS. 1A, 1B and 1C constitute a block diagram of the software timing system of the present invention.

Referring now to the drawings, and particularly to FIGS. 1A–C and 3A–C, range timer 1 is connected to a synchronous memory bus indicated by reference numeral 5. Synchronous memory bus 5 includes 18 lines designated A00–A17 (FIG. 1A). Range timer 1 is also connected to a main memory bus designated by reference number 3, having conductors A00'–A17'. Synchronous memory bus 5 and main memory bus 3 are connected to inputs of a multiplexer circuit 9, which can be readily implemented by means of a plurality of Texas Instruments 74157 integrated circuit multiplexers. A memory select conductor indicated by reference numeral 7 is also connected to a channel select input of multiplexer 9. The 18 outputs of multiplexer circuit 9 are connected by means of bus 11 to the respective inputs of comparators 13A and 13B, which may be implemented by means of a plurality of Texas Instruments 7485 integrated circuit digital comparators. The memory select signal on memory select conductor 7 determines whether the respective conductors of synchronous memory bus 5 or main memory bus 3 are to be multiplexed to the respective inputs of comparators 13A and 13B.

Other inputs of comparator 13A, with which signals on the 18 outputs of multiplexer 9 are respectively compared, are connected to 18 conductors of a bus 15, referred to as the upper address bus. The respective conductors of bus 15 are connected to corresponding conductors of a cable 131, shown in FIGS. 3A and 3C. Those conductors are connected to respective ones of 18 upper limit switches 125, shown in FIG. 3A. The 18 upper limit switches 125 are toggle switches mounted on a control panel and are utilized to manually set a binary address representing the upper limit of the range of addresses to be measured by range timer 1, as subsequently explained.

Comparator 13A has 3 outputs designated by reference numerals 19A, 19B and 19C, all connected to inputs of logic circuit 23. Comparator 13A produces a logical "one" on conductor 19A if the 18 bit address produced at the output of multiplexer 9 is greater than the upper limit address preset by toggle switches 125. A logical "one" is produced on conductor 19B if the address produced at the outputs of multiplexer 9 is equal to the upper limit address preset by toggle switches 125. A logical "one" is produced on conductor 19C if the address produced on outputs of multiplexer 9 is less than the upper limit address preset by toggle switches 125 on the control panel.

The respective inputs of comparator 13B with which the 18 bits of the address produced at the outputs of multiplexer 9 are respectively compared are connected to the 18 conductors of lower address bus 17. Bus 17 is connected by means of cable 131 to respective toggle switches 139 in FIG. 3A. The 18 toggle switches designated by reference numeral 139 are mounted on the above mentioned control panel and are utilized by an operator to manually set a lower limit address which represents the lower limit of a range within which program execution having addresses within a predetermined range is timed by range timer 1.

Comparator 13B has three outputs 21A, 21B and 21C, which indicate whether the address produced at the outputs of multiplexer 9 is greater than, equal to, or less than, the lower limit address preset by means of lower limit toggle switches 139, respectively. Three outputs 21A, 21B and 21C of comparator 13B are connected to inputs of logic circuit 23.

Figure 1B:
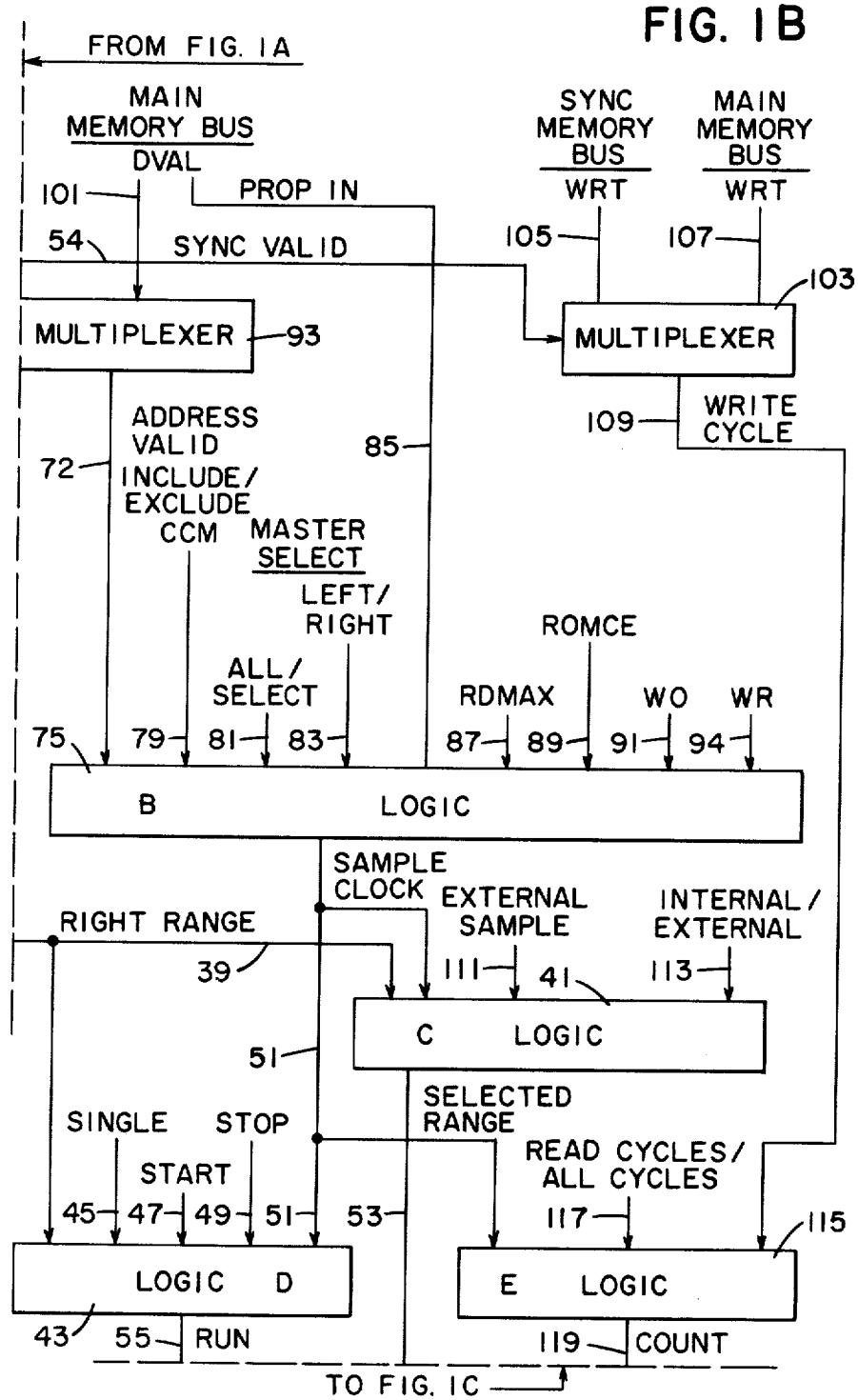

The purpose of logic circuit 23 is to produce a "right range signal" on conductor 39 (FIG. 1B). The right range signal indicates whether the address on the selected one of synchronous memory bus 5 and main memory bus 3 is within the range of addresses having binary values between the lower address set by means of lower limit toggle switches 139 and upper address limit toggle switches 125.

Logic circuit 23 has four additional inputs, including "external range qualifier" input 25, "internal only" input 33, "inside/outside" input 35, and "range/exact stop" input 37. External range qualifier input 25 can be utilized to cause logic circuit 23 to inhibit the right range signal on output 39 during a peripheral cycle request (PCR) operation if a logical "one" is applied to input 29 of logic circuit 27, or during a polling operation, if input 31 of logic circuit 27 is at a logical "one". If the output of logic circuit 27 is externally connected to "external range qualifier" input 25, then the foregoing inhibiting will occur if either of the PCR or POLL signals are present. Ordinarily, "external range qualifier" input 25 is connected because it is ordinarily desired to exclude the amount of time required for peripheral cycle request operations or polling operations in determining the execution time for a particular software module.

The signal on conductor 33, which is connected to switch 145 of control panel of FIGS. 3A–C enables the user to cause range timer 1 to measure only the execution of instructions stored in an "on board" memory (subsequently described) if switch 145 is in its "CCM only" position. If switch 145 is in its CCB-II position, then the measurement performed includes or excludes the execution of instructions in the on board memory, depending on the state of switch 147 (which is connected to conductor 79 of FIG. 1B).

The signal on input 35 of logic circuit 23 indicates whether or not range timer 1 is to measure execution times for addresses inside or outside of the range between upper limit address switches 125 and lower limit address switches 139. Input 37 to logic circuit 23 causes range timer 1 to stop measuring program execution time or counting the number of instructions executed if the address of an instruction on the selected memory bus (i.e., synchronous memory bus 5 or main memory bus 3) is outside of the range between the upper limit switches 125 and the lower limit switches 139. The "exact stop" position of toggle switch 139A in FIG. 3A to which input 37 of logic circuit 23 (FIG. 1A) is connected by means of cable 131, causes range timer 1 to continue measuring address execution time (i.e., program execution time) until occurrence of an instruction address equal to the upper limit address present by upper limit switches 125.

Figure 3B:
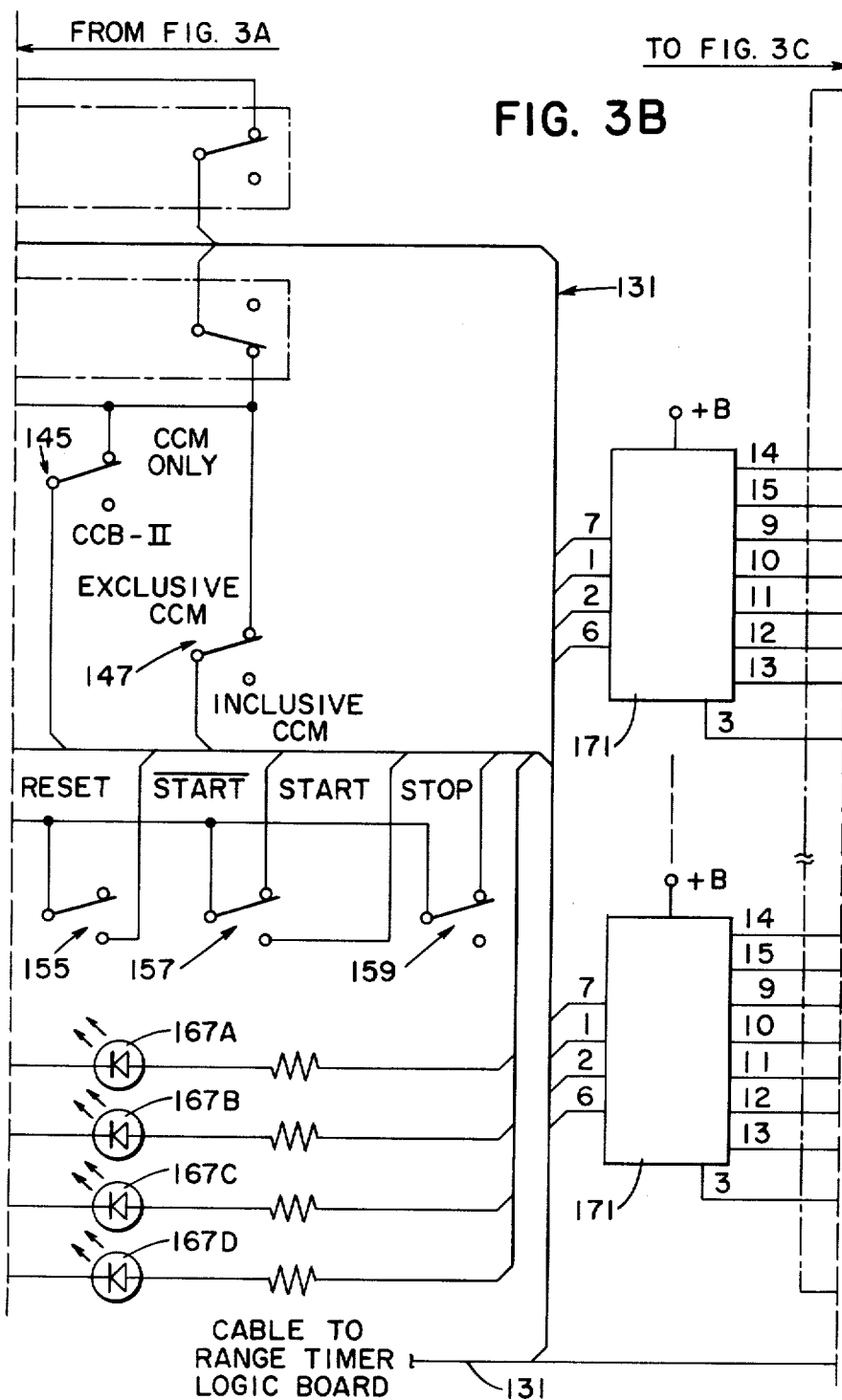

Input 35 of logic circuit 23 is connected by means of cable 131 to toggle switch 161 of FIG. 3A. Input 33 of logic circuit 23 is connected by means of cable 131 to toggle switch 145 of FIG. 3B.

The right range signal produced by logic circuit 23 on conductor 39 is connected to inputs of logic circuit 43 and logic circuit 41 (FIG. 1B). Logic circuit 43 has inputs connected to conductors 45, 47, 49 and 51. The "sample clock" input is applied to conductor 51 by logic circuit 75, subsequently described. A "stop" signal is applied to conductor 49. Conductor 49 is connected by means of cable 131 to toggle switch 159 of FIG. 3B, and operates to stop the timing operation performed by range timer 1. A "start" signal is applied to conductor 47, which is connected by means of cable 131 to toggle switch 157 of FIG. 3B and performs the function of starting operation of range timer 1.

A "single" signal is applied to conductor 45, which is connected by means of cable 131 to toggle switch 137 of FIG. 3A. The "single" signal determines whether range timer 1 measures the execution time of a single entry into the range and exit out of the range or continues to measure time for a sequence of executed instructions.

Figure 1C:
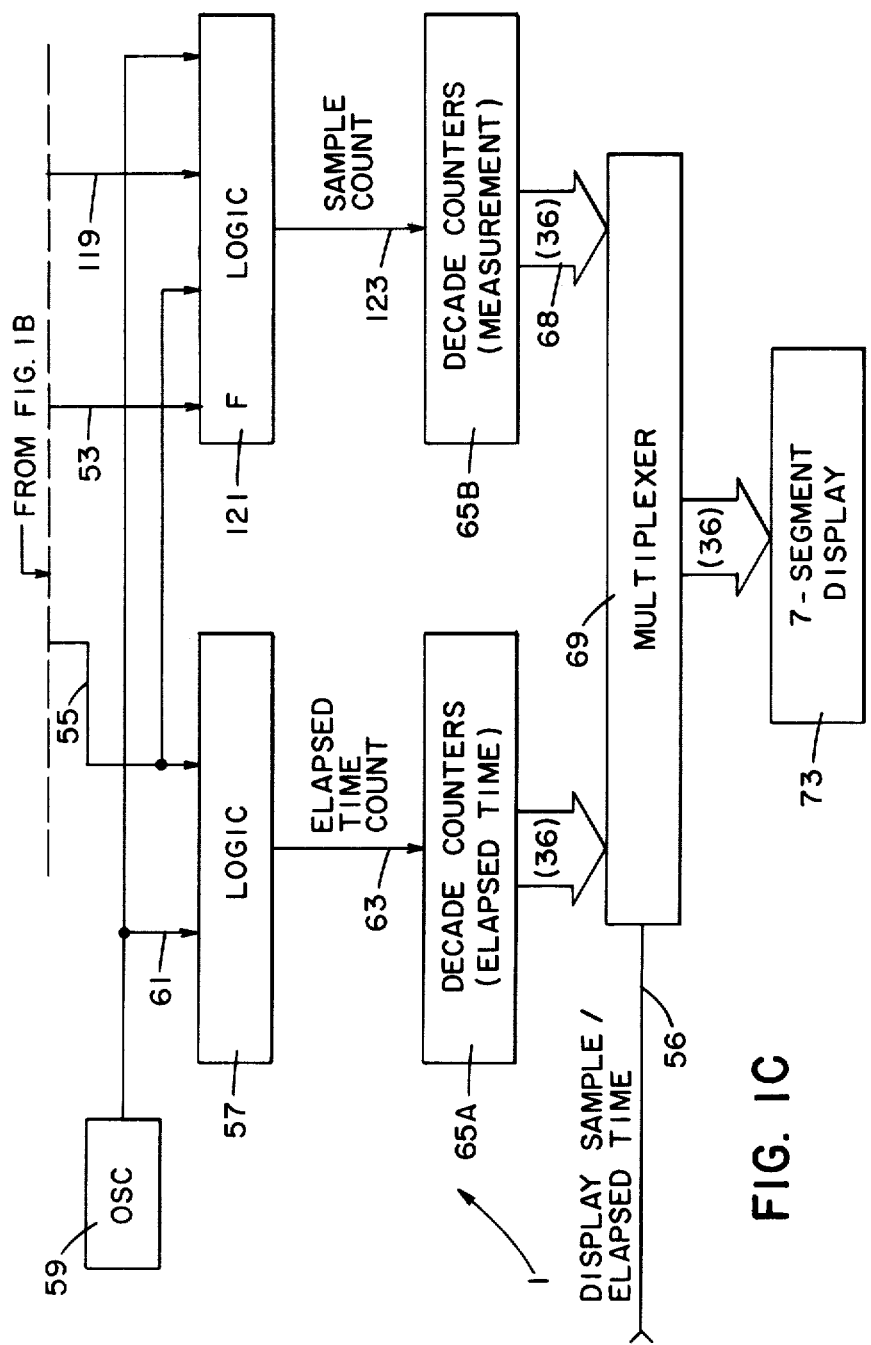

The output of logic circuit 43 produces a "run" signal on conductor 55. Conductor 55 is connected to an input of logic circuit 57 and to an input of logic circuit 121 (FIG. 1C). The counters, subsequently described, of range timer 1, are enabled by the "run" signal produced on conductor 55.

Logic circuit 121 has inputs connected to conductors 61, 55, 53, and 119. Free-running oscillator 59 produces a four megahertz clock signal on conductor 61. A "selected range" signal is produced on conductor 53 by logic circuit 41. The "selected range" signal, when at a logical "one", performs the function of indicating that the instruction being executed is within the range between the upper and lower address limits set by switches 125 and 139, respectively.

The "external sample" signal applied to input 111 of logic circuit 41 performs a function explained subsequently.

Logic circuit 115 (FIG. 1B) produces a signal labeled "count" on conductor 119. Logic circuit 115 has inputs connected to conductor 51, conductor 117, and conductor 109. A "write cycle" signal is produced on conductor 109 by multiplexer circuit 103, which multiplexes a synchronous memory write signal on conductor 105 or a main memory write signal on conductor 107 to conductor 109, depending upon which memory is selected by memory select conductor 7.

A signal referred to as "read cycles/all cycles" is applied to conductor 117, which is connected to toggle switch 135 in FIG. 3A. Toggle switch 135 in FIG. 3A performs the function of causing only read cycles to be counted by range timer 1 or of causing all cycles to be counted.

Toggle switch 137 of FIG. 3A enables the user to measure the time between one entry into and one exit from the predetermined range of addresses defined by upper limit switches 125 and lower limit switches 139.

The "single" signal applied to conductor 45 (which is connected to an input of logic circuit 43) is connected by means of cable 131 to toggle switch 137 of FIG. 3A.

Toggle switch 143 of FIG. 3A enables the user to determine whether range timer 1 measures software execution time by a processor which is located to the left or right of range timer 1 with respect to the location of its connection to main memory bus 3. Note that a large number of processors can be connected to the main memory bus 3 to which range timer 1 is connected. Thus, toggle switch 143, in conjunction with toggle switch 141 (FIG. 3A) when it is in the "select" position, enables the user to determine whether range timer 1 measures the execution of instructions by one of those processors which is located on main memory bus 3 either to the right or left of range timer 1.

The "count" signal produced on conductor 119 by logic circuit 115 produces a signal which enables logic circuit 121 to produce the "sample count" signal on conductor 123, which directly increments decade counter 65B (FIG. 1C) at a one megahertz rate if the "run" and "selected range" signals are present on conductors 55 and 53, respectively. Thus, whenever the addresses being executed by means of the main memory bus 3 (or the synchronous memory bus 5 if that bus is selected) are within the range determined by upper address limit switches 125 and lower limit address switches 139, decade counter 65B continues to count, thereby accumulating (in effect), total cumulative execution time or number of instructions executed for all addresses executed within the predetermined range. Any time that an address outside of that preset range is executed, decade counter 65B stops, but will restart when the next instruction is executed inside the preset range.

Logic circuitry 57 performs the function of producing the "elapsed time count" signal on conductor 63, which has a one megahertz frequency whenever the run signal on conductor 55 is present. The "elapsed time count" signal increments decade counter 65A (FIG. 1C), referred to as the "elapsed time counter", whenever the range timer is in a "run" mode. Thus, elapsed time counter 65A simply accumulates (in effect) total elapsed time between the time at which the operator actuates the start switch 157 and the time that he actuates the stop switch 159 (FIG. 3B).

Multiplexer circuit 69 (FIG. 1C) multiplexes the respective outputs of either elapsed time counter 65A or execution time counter 65B to the seven segment display module 73, depending upon the logic level on "display sample/elapsed time" conductor 56, which is connected by means of cable 131 to toggle switch 151 of FIG. 3A. Thus, the user can display either elapsed time or execution time on seven segment display module 73. As shown in FIG. 3C, seven segment display module 73 includes a plurality of numeric display elements, such as 169.

As shown in FIG. 1B, logic circuitry 75 (which produces the "sample clock" signal on conductor 51) has inputs 72, 79, 81, 83, 85, 87, 89, 91 and 94. An "address valid" signal is applied to conductor 72 by the output of multiplexer 93. Multiplexer 93 multiplexes the signal DVAL (data valid) on conductor 101 or the "sync valid" signal on conductor 54 to conductor 72, depending upon whether the synchronous memory bus 5 or the main memory bus 3 is selected by the memory select signal on conductor 7.

The "sync valid" signal on conductor 54 is produced by logic circuit 95 (FIG. 1A) in response to a memory cycle request signal DMCR on conductor 99 or an arbitration control signal CARB on conductor 97, both signals being produced by a synchronous memory operating in conjunction with a main processor independently of the main memory to which the main memory bus 3 is connected and in which the instructions constituting the software module being timed are stored. The DVAL signal on conductor 101 (FIG. 3B) is produced by the main processor to indicate when valid addresses are present on main memory bus 3.

Input 79 of logic circuitry 75 (FIG. 1B) is connected by means of cable 131 to toggle switch 147 of FIG. 3B which performs a function explained subsequently herein. Conductor 81 of logic circuitry 75 is connected by means of cable 131 to toggle switch 141 of FIG. 3A, which performs a function subsequently explained. Conductor 83 is connected to left/right toggle switch 143 of FIG. 3A by means of cable 131. The function of this switch previously has been explained herein. The PROP IN signal, subsequently explained, on conductor 85 (FIG. 1B) of logic circuitry 75, is produced on main memory bus 3. The processor (not shown) executing the instructions of the software module being timed produces signals RDMAX, ROMCE, WO, and WR on conductors 87, 89, 91, and 94, respectively.

The sample clock signal produced on conductor 51 (FIG. 1B) is simply a delayed version of the address valid signal produced on conductor 72.

The multiplexer 69 of FIG. 1C can be readily implemented by those skilled in the art by utilizing Texas Instruments 74157 integrated circuit multiplexers. The respective multiplexer outputs are connected by means of cable 131 to Texas Instruments 9368 binary coded decimal two-of-seven segment decoder integrated circuits (such as the ones represented by reference numerals 171 in FIG. 3B) and to the respective inputs of the light emitting diode display elements designated by reference numeral 169 in FIG. 3C, are readily commercially available and have an NCR stock number 006-0008423.

Elapsed time decade counter 65A and execution time counter 65B can be readily implemented by those skilled in the art by utilizing Texas Instruments 7490A integrated circuit decimal counters, the outputs of which can be coupled directly to the inputs of the above mentioned multiplexer 69. The 97490A decimal counters can be connected in series to implement elapsed time counter 65A, "elapsed time count" conductor 63 being connected directly to the "increment" input of elapsed time counter 65A, which represents the least significant digit. Execution time counter 65B is implemented entirely similarly. Both counters are reset by means of toggle switch 155 of FIG. 3B.

Oscillator 59 (FIG. 1C) can be easily implemented by those skilled in the art by utilizing a Texas Instruments 74LS124 oscillator 59' and a four megahertz crystal 59''. Logic circuitry 57 is implemented by means of a Texas Instruments 7493A binary counter having its "increment" input connected to a logic gate which logically ANDs the four megahertz signal on conductor 61 and the run signal on conductor 55 to produce a one megahertz frequency for the elapsed time count signal on conductor 63.

Figure 2A:
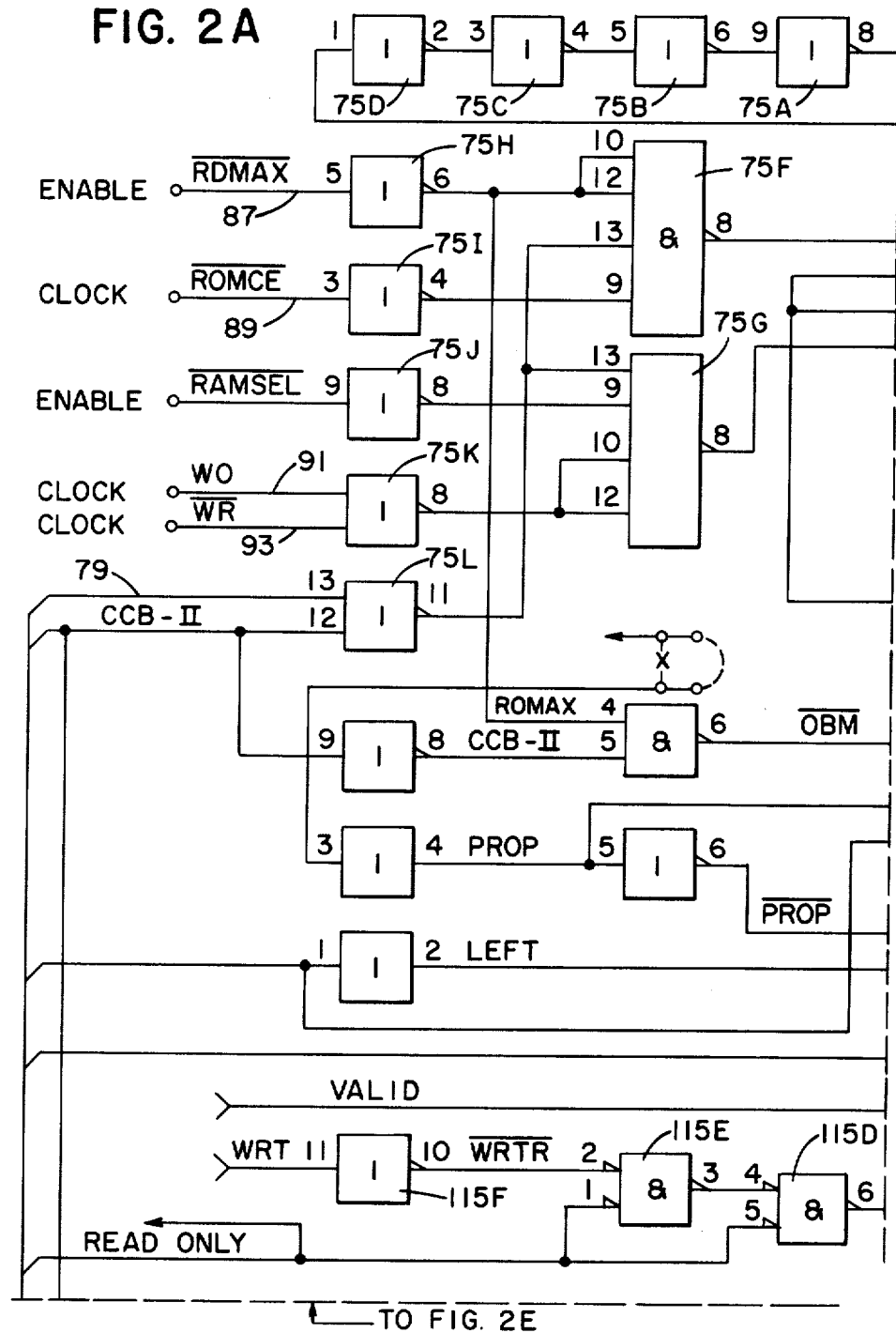
Figure 2B:
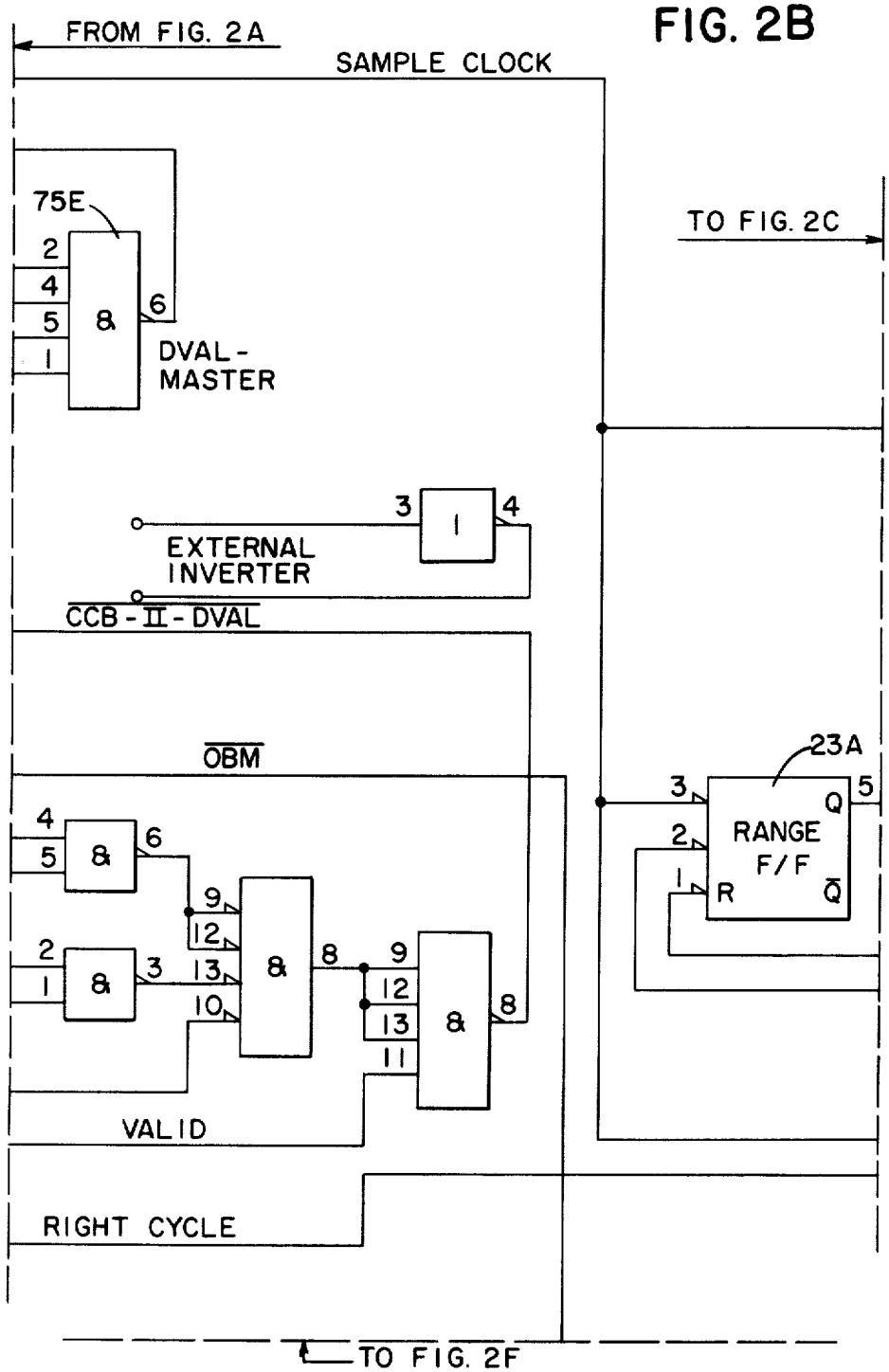
Figure 2D:
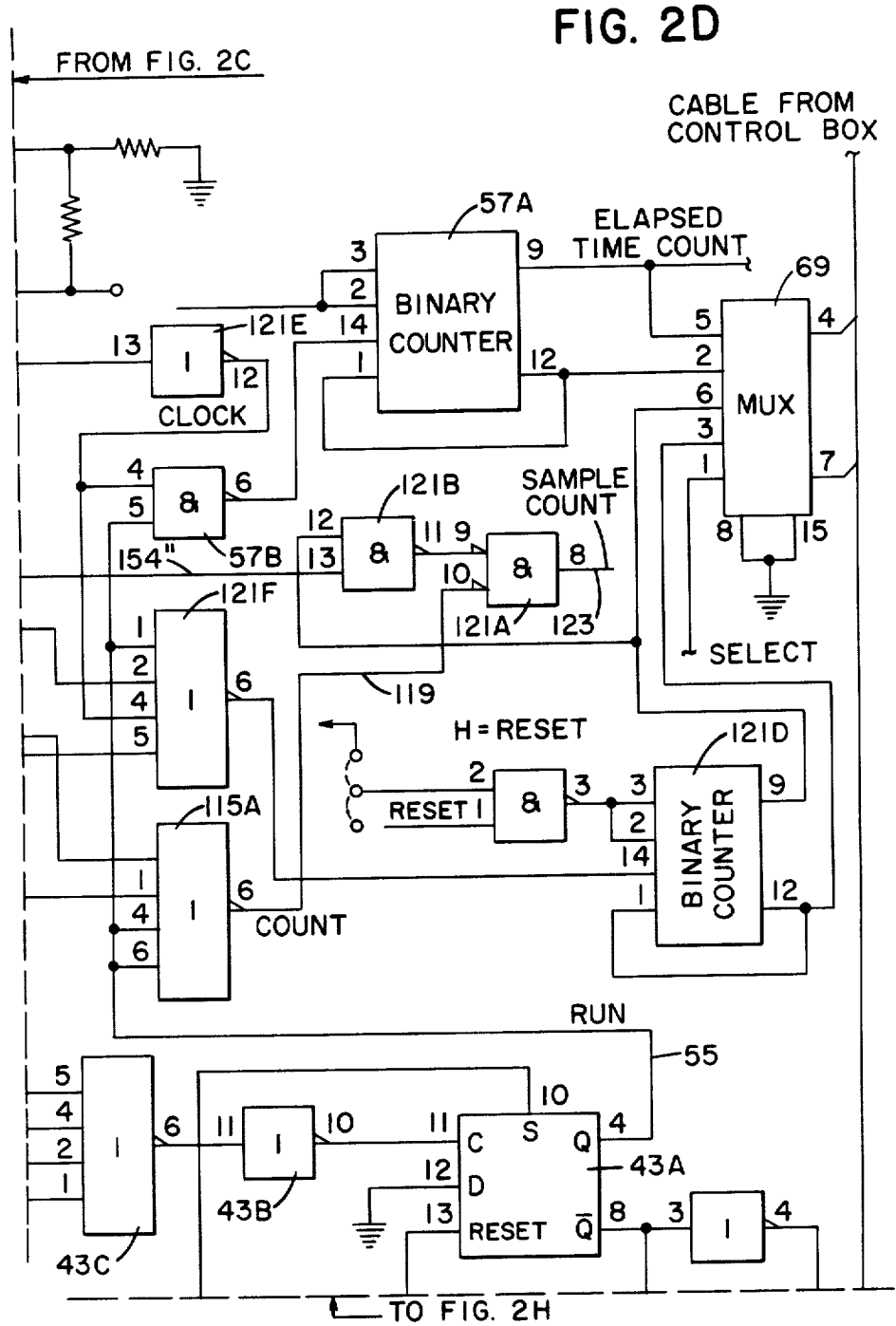

Logic circuitry 121 in FIG. 1C can be implemented by means of logic gates 121A, 121B, counter 121D, logic gate 121E, and logic gate 12F in FIG. 2D. (It should be noted that the logic gates in the drawings are represented by blocks including an "&" symbol or a "1" therein. The "&" symbol indicates that the logic gate performs a logical "ANDing" function, and the "1" symbol indicates that the logic gate performs a logical "ORing" function. Blocks with a single input and a "1" therein and a small triangular arrow on either an output or input represent inverters; those without a small triangular arrow on either an input or output represent non-inverting buffers. The small triangular arrows appearing on inputs and outputs of the logic gates indicate logic signal inversion.) Logic circuitry 57 can be implemented by means of binary counter 57A (a Texas Instruments 7493A) and logic gate 57B in FIG. 2D.

Logic circuitry 115 in FIG. 1B is implemented mainly by means of logic gates 115A, 115B, 115C, 115D, 115E, and 115F in FIGS. 2A, 2C and 2D. Logic circuit 43 in FIG. 1B includes flip/flop 43A, logic gate 43B, logic gate 43C, logic gate 43D, logic gate 43E, logic gate 43F, and logic gate 43G of FIGS. 2D, 2E and 2F. Logic circuitry 41 in FIG. 1A can be implemented by logic gates 41A, 41B, 41C, and 41D in FIGS. 2A and 2C. Logic circuitry 75 (FIG. 1B) is implemented by means of logic gates 75A-75L in FIGS. 2A and 2G. Logic circuitry 23 in FIG. 1A can be implemented by means of flip/flop 23A, (FIG. 2B) referred to as the "range flip/flop", and logic gates 23B-23L in FIGS. 2E-2G. Multiplexers 9, 93 and 103 can be readily implemented by those skilled in the art by means of Texas Instruments 74157 multiplexer integrated circuits.

The "external sample" signal applied to conductor 111 of logic circuitry 41 (FIG. 1B) is also designated by reference numeral 111 in FIG. 2C. The "external sample" signal is a signal which can be applied from an external source and applied to an input of NAND gate 41B. If toggle switch 133 of FIG. 3A is in the "internal" position, then range flip/flop 23A (FIG. 2B) will cause the "selected range" signal produced on conductor 43 (FIG. 1B) to appear when the address appearing on the selected memory bus (either synchronous memory bus 5 or main memory bus 3) falls within the selected range determined by the settings of the upper address limit switches 125 and/or the lower address limit switches 139 and the setting of the inside/outside toggle switch 161 of FIG. 3A. However, if toggle switch 133 is in the "external" position, and if an external control signal (i.e., the "external sample" signal) is connected to conductor 111, then the output of range flip/flop 23A (FIG. 2B) will not determine the "selected range" signal produced on conductor 53. Instead, the timing operation of range timer 1 will be controlled by the "external sample" signal applied to conductor 111. In other words, the "external" position of toggle switch 133 enables the "external sample" signal to be inputted logic to the circuitry 41 to control the producing of the "selected range" signal. The "external sample" signal on conductor 111 (FIG. 2C), operating in conjunction with the logic gates 41A, 41B, 41C and 41D, overrides the output of range flip/flop 23A (FIG. 2B). The "internal" signal on conductor 33 gates the "right range" signal from the output of range flip/flop 23A. Thus, if the toggle switch 133 (FIG. 3A) is in the "external" position, the "right range" signal is not inputted to logic gate 41A, and does not affect the "selected range" signal on conductor 53.

Toggle switch 135 of FIG. 3A controls whether or not range timer 1 counts all memory cycles executed on the selected memory bus or only the read cycles executed on the selected memory bus when range timer 1 is operating in the timing mode rather than the counting mode.

Range timer 1 is in the timing mode if toggle switch 149 of FIG. 3A is in the "sample time" position, and is in the "counting" mode if toggle switch 149 is in the "sample counts" position. If range timer 1 is in the timing mode, execution timer/counter 65B (FIG. 1C) is continually incremented while the instructions being executed are outside the selected range.

Figure 2E:
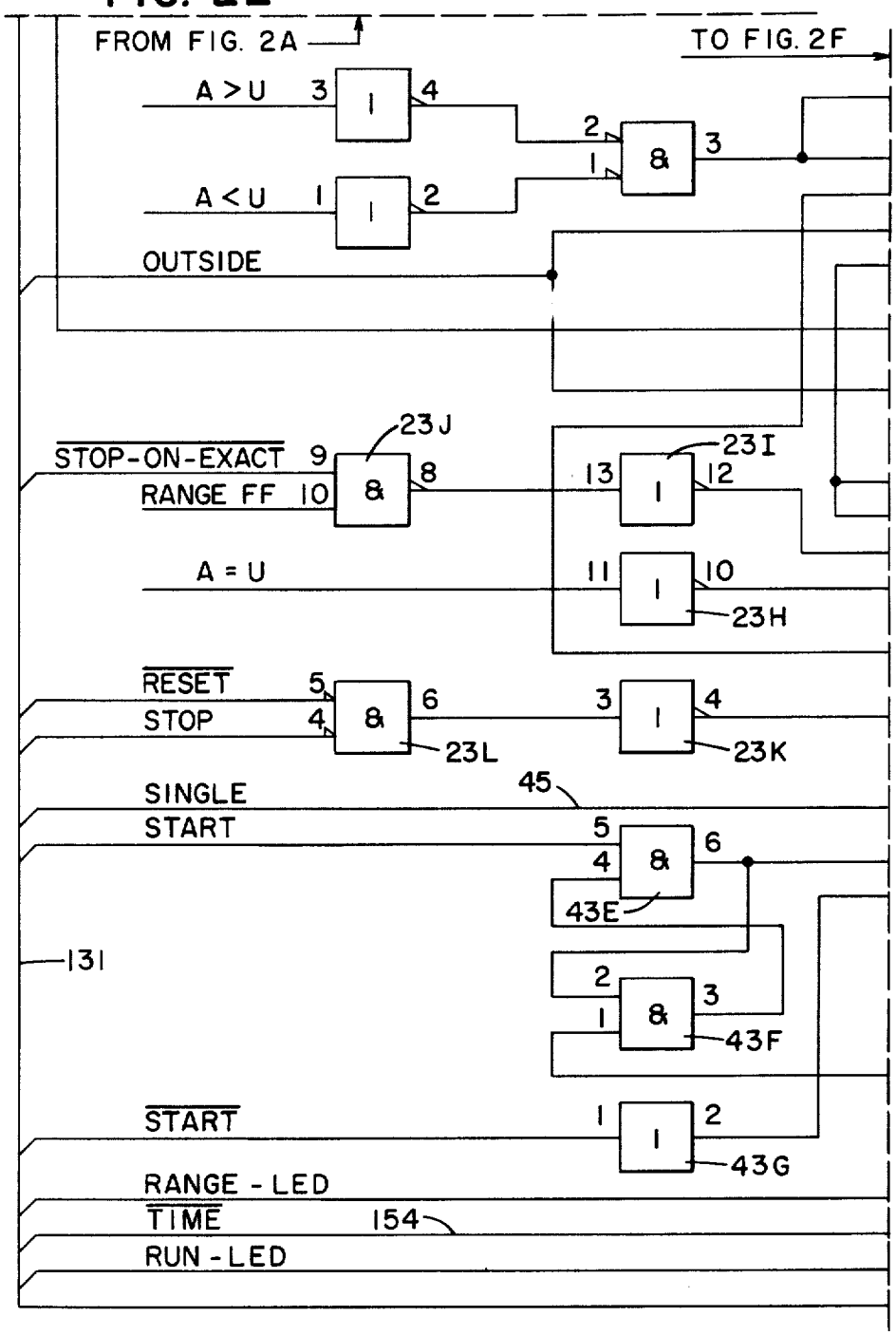
Figure 2F:
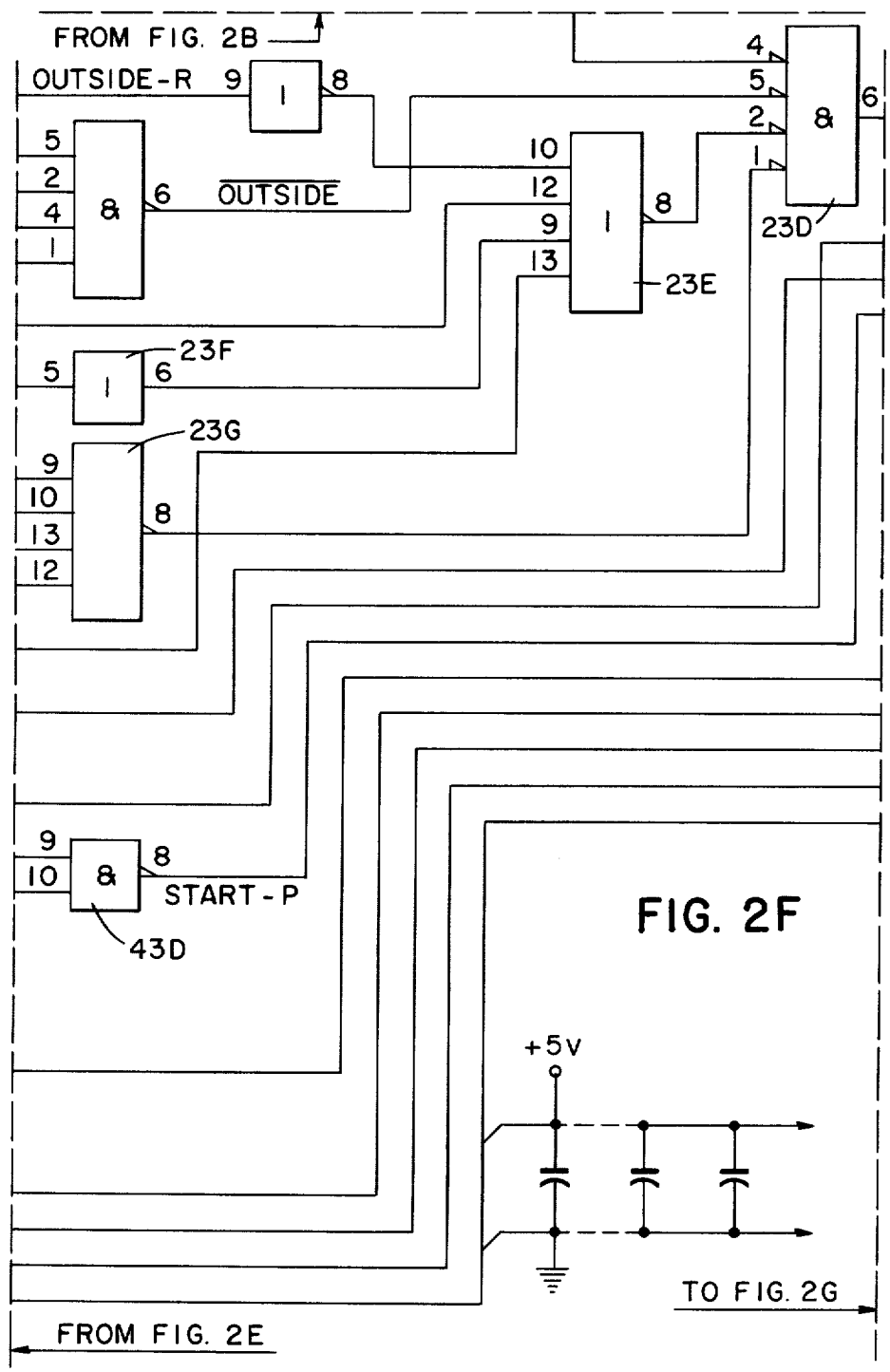
Figure 2G:
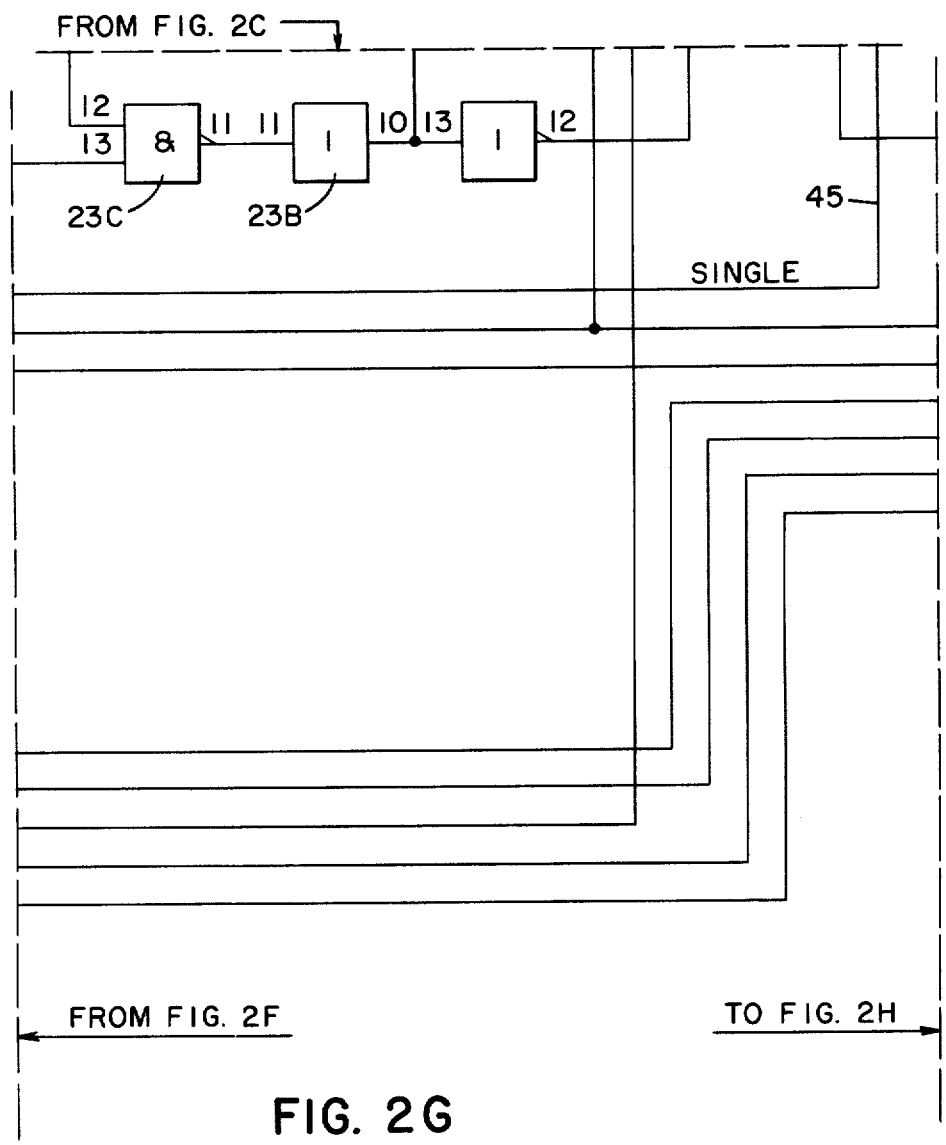
Figure 2H:
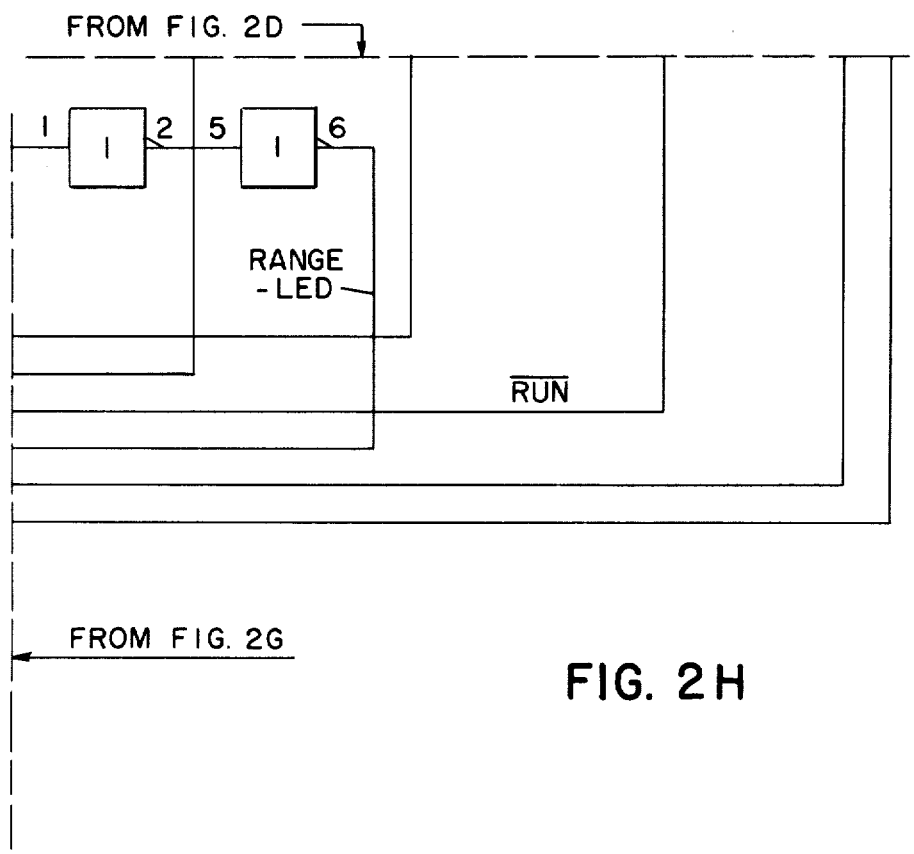

The TIME signal on conductor 154 in FIG. 2E and FIG. 3 is connected by means of cable 131 to conductor 154' (which is connected to toggle switch 149 in FIG. 3A.) This signal is connected by means of logic gate 156 (FIG. 2C) to conductor 154", which is connected to one input of NAND gate 121B, thereby enabling the one megahertz output of binary counter 121D to establish the pulse rate of the "sample count" signal on conductor 123. If range timer 1 is in the counting mode, the "sample count" pulse only increments execution timer/counter 65B once for each new address which appears on the selected memory bus. However, if range timer 1 is in the timing mode, then the "sample count" signal clocks execution timer/counter 65B at a one megahertz rate as long as the "selected range" signal is present on conductor 53. (It should be noted that the term "measure" as used herein can include both measurement of time required for instruction execution or number of instructions executed.)

When range timer 1 is in the counting mode, range timer 1 has the option of counting all memory cycles or only read cycles, depending upon whether toggle switch 135 (FIG. 3A) is in the "all cycles" or "read cycles" position.

If toggle switch 137 of FIG. 3A is in the "single sample" position, (see conductor 45 of FIGS. 1B and 2C) then range timer 1 only "times" or counts memory cycles on the selected memory bus from the time at which an initial address entry is made into the selected range until the time a subsequent address outside of the selected range is executed.

If toggle switch 137 is in the "single sample" position, the timing or counting is initiated as soon as an address occurs on the selected bus within the selected preset range. The only thing that stops the timing or counting is occurrence of an address on the selected memory bus which is outside the selected range. In that case, the range timer is permanently stopped.

When toggle switch 139 is in the "exact stop" position, then range timer 1 stops timing or counting when an address on the selected memory bus occurs which is exactly equal to the preset upper limit address determined by upper limit toggle switches 125. If toggle switch 139-A is in the "range stop" position, then range timer 1 continues timing or counting whenever the address being executed on the selected memory bus is in range determined by upper limit switches 125 and lower limit switches 139, assuming that toggle switch 137 is in the "continuous sample" position. The term "range stop" associated with toggle switch 139A in FIG. 3 is selected to indicate that timing stops whenever addresses being executed are outside of the selected range. The term "exact stop" (for switch 139A) is selected to indicate that timing by the range timer stops when an address is executed which is equal to the exact value set by the upper limit addresses switches 125. When toggle switch 139A is in the "exact stop" position, counting or timing by range timer 1 continues to occur, regardless of whether the addresses being executed are within the selected range, as long as toggle switch 137 is in the "continuous sample" position.

If toggle switch 141 is in the "all" position, then toggle switch 143 is ignored. In this event, all addresses executed by means of a selected memory bus are counted or timed by range timer 1, without regard to which processor or other device transmits the address on a selected memory bus. If toggle switch 141 is in the "selected" position, then range timer 1 will time or accumulate execution time of addresses which are executed by either a processor which is located to the left of range timer 1 on the selected memory bus or to the right of range timer 1 on the selected memory bus, depending upon whether toggle switch 143 is in the "right" position or the "left" position. Appropriate connections to the range timer for signaling when the processors to the left and right are executing instructions on the selected bus can be readily provided.

If toggle switch 145 (FIG. 3B) is in the "CCM only" position, then range timer 1 is capable of timing or counting address executions which occur only in a memory which is closely associated with the selected processor, sometimes referred to as an "on board" memory. However, if toggle switch 145 is in the "CCB-II" position then the measurement of instructions executed in "on board" memory can be included or excluded, depending on the state of switch 147.

If toggle switch 147 is in the "exclude CCM" position, then range timer 1 only times or counts execution of addresses accessing the main memory. However, if toggle switch 147 is in the "include CCM" position, then range timer 1 times or counts execution of addresses accessing either the "main memory" or the "on board" memory.

If toggle switch 161 (FIG. 3A) is in the "outside range" position, then the selected range is defined as those addresses lying outside the limits set by upper limit address switches 125 and lower limit address switches 139. However, if toggle switch 161 is in the "inside range" then the selected range includes that range of addresses which lies inside the limits set by upper limit address switches 125 and lower limit address switches 139.

The "selected range" signal on conductor 53 (FIG. 1B) is the signal which results from gating either the "external sample" signal on conductor 111 or the "right range" signal on conductor 39 in accordance with the state of toggle switch 133 of FIG. 3A.

The DVAL signal is one produced by the processor to indicate when address information outputted to main memory bus 3 is valid.

The "PROP IN" signal (FIG. 1B) is generated by various processors connected to the main memory bus to enable them to arbitrate among themselves which processor is entitled to use the main memory bus next, and is utilized by range timer 1 in conjunction with the "right/left" signal produced by toggle switch 143 to determine which addresses on the selected bus are to be timed or counted and which addresses on that bus are to be excluded from the timing or counting operations.

The WO and WR signals appearing on conductors 91 and 93, which are connected to inputs of logic circuitry 75, are internal control signals produced by the processor connected to the main bus. The same is true of the RDMAX signal and ROMCE signals appearing on conductors 87 and 89, respectively. The circuitry of range timer 1 has been designed to require these signals in order to enable range timer 1 to time or count memory activity on the "on board" memory.

Light emitting diodes 165A 165B (FIG. 3A), 167A, 167B, 167C and 167D (FIG. 3B) are connected to indicate whether range timer 1 is in certain modes of operation, including whether the instruction address presently being executed is in the selected range, whether or not "counting mode" or "timing mode" has been selected, and whether or not the range timer is running.

While the invention has been described with reference to a particular embodiment thereof, those skilled in the art will be able to make various modifications to the described embodiment without departing from the true spirit and scope of the invention, as set forth in the appended claims.

I claim:

1. A system for measuring execution time required for the execution of a plurality of instructions from a plurality of addresses in a memory, each of the instructions being stored in said memory and having a particular address associated therewith, said memory being accessed by means of a memory bus to effect executing of said instructions, said system comprising in combination:
   a. first coupling means for coupling said system to the memory bus;
   b. first comparison means responsive to said first coupling means for comparing any particular address and subsequent said particular addresses on the memory bus with a first address number to detect whether said particular address and subsequent said particular addresses are in a first range bounded by said first address number;
   c. first logic circuit means responsive to said first comparison means for producing a first signal having a first level while a said particular address and subsequent said particular addresses are in said first range and a second level if said particular address and subsequent said particular addresses are not in said first range; and
   d. first counting means responsive to said first logic circuit means for counting at a predetermined rate to produce an accumulated count if said first signal is at said first level, wherein said first counting means does not count if said first signal is at said second level, the accumulated count in said first counting means representing the accumulated execution time during which addresses on said memory bus from said plurality of addresses are in said first range.

2. The system of claim 1 further including second comparison means for comparing any said particular address and subsequent said particular addresses with a second address number to detect whether said particular address and subsequent said particular addresses are in a second range bounded by said second address number, said first logic circuit means further being responsive to said second comparison means for causing said first signal to have said second level if any of said particular addresses is not within said second range, said accumulated count representing the accumulated execution time during which addresses on said memory bus are in either of said first and second ranges.

3. A system for measuring execution of a plurality of instructions, from a plurality of addresses in a memory, each of the instructions being stored in said memory and having a particular address associated therewith, the memory being accessed by means of a first memory bus to effect executing of said instructions, said system comprising in combination:
   a. first coupling means for coupling said system to the first memory bus;
   b. first comparison means responsive to said first coupling means for comparing a particular address and subsequent said particular addresses received from the first memory bus with a first address number to detect whether said particular address and subsequent said particular addresses are greater than or less than said first address number;
   c. second comparison means responsive to said first coupling means for comparing said particular address and subsequent said particular addresses with a second address number to detect whether said particular address and subsequent said particular addresses are greater than or less than said second address number;
   d. selection means for producing a first signal to selectively determine whether said system is to measure said execution if a said particular address is in a first range between said first and second address numbers or if a said particular address is in a second range including addresses greater than said first address number and less than said second address number;
   e. logic circuit means responsive to said first signal and said first and second comparison means for producing a second signal indicative of whether said particular address and subsequent said particular addresses are in the selected one of said first and second ranges; and
   f. first counting means responsive to said second signal for counting at a predetermined rate while said particular address and subsequent said particular addresses are in a said selected range, wherein an accumulated count in said first counting means represents the accumulated measurement of said execution of instructions during which said particular address and subsequent particular addresses on said memory bus are in said selected range and wherein said first counting means does not count if said particular address and subsequent particular addresses are not in said selected range.

4. The system of claim 3 including means for presetting said first counting means to an initial value before beginning execution of said plurality of instructions.

5. The system of claim 4 further including a control panel and first limit means disposed on said control panel for effecting selecting a value for said first address number and second limit means disposed on said control panel for effecting selecting of a value for said second address number.

6. The system of claim 5 wherein said system is capable of measuring execution time required for executing instructions stored in a second memory which is accessed by means of a second memory bus, said first coupling means selectively coupling said first and second comparison means to a selected one of said first and second buses, wherein a said particular address is received from the selected one of said first and second memory buses.

7. The system of claim 6 including first mode selection means for selecting either a timing mode of operation or a counting mode of operation for said system to selectively control said predetermined rate, causing said predetermined rate to be one count for each instruction executed on said first memory bus if said counting mode is selected and causing said predetermined rate to be a fixed number of counts per second if said timing mode is selected.

8. The system of claim 7 further including second counting means for measuring elapsed time from an initial time at which said measuring begins.

9. The system of claim 5 wherein said first coupling means includes a multiplexer circuit.

10. The system of claim 8 further including means for displaying the number of counts in said first counting means.

11. The system of claim 8 further including means for displaying the number of counts in said second counting means.

12. The system of claim 7 wherein said first mode selection means includes a manual switch disposed on said control panel to effect selecting of said counting mode or said timing mode.

13. The system of claim 3 wherein each of said first and second comparison means each includes a digital comparator circuit, and wherein said first counting means includes a digital counter circuit.

14. The system of claim 7 wherein said first memory is coupled to a processor by said first memory bus and wherein said processor can execute either a first group of instructions by means of said first memory and said first memory bus, or a second group of instructions by means of a third memory without using said first memory bus, said system including second mode selection means for selectively controlling whether said system measures execution only of said first group of instructions, execution only of said second group of instructions, or execution of both said first and second groups of instructions.

15. The system of claim 5 further including means for selectively controlling whether said first counting means measures execution of only those of said instructions which are read instructions or of all said instructions, including both read and write instructions.

16. A method of measuring execution of one of a plurality of instructions located at respective particular addresses in a memory by means of a processor, said method comprising the steps of:
   a. selecting a first address limit number and a second address limit number;
   b. selecting either a first range including addresses between said first address limit number and said second address limit number, or a second range including addresses greater than said first address limit number and less than said second address limit number;
   c. transmitting a first address from a first memory bus to a first comparator and a second comparator;
   d. comparing said first address with said first address limit number by means of said first comparator;
   e. comparing said first address with said second address limit number by means of said second comparator;
   f. producing a first signal in response to said comparing steps, said first signal indicating whether said first address is in said selected one of said first and second ranges; and
   g. measuring time during which said first signal indicates that said first address is in said selected one of said first and second ranges.

17. A method of measuring execution of a plurality of instructions from a plurality of addresses in a memory by means of a processor, said method comprising the steps of:
   a. selecting a first address limit number and a second address limit number;
   b. selecting either a first range including addresses between said first address limit number and said second address limit number, or a second range including addresses greater than said first address limit number and less than said second address limit number;
   c. transmitting a first address from a first memory bus to a first comparator and a second comparator;
   d. comparing said first address with said first address limit number by means of said first comparator;
   e. comparing said first address with said second address limit number by means of said second comparator;
   f. producing a first signal in response to said comparing steps, said first signal indicating whether said first address is in said selected one of said first and second ranges;
   g. measuring time during which said first signal indicates that said first address is in said selected one of said first and second ranges; and
   h. repeating said steps (c), (d), (e), (f) and (g) for additional other addresses of said plurality of instructions and continuing said measuring until an occurrence of an address equal to said first address limit number.

18. The method of claim 17 wherein step (g) includes accumulating time measurements by means of a counter when instructions having addresses in said selected one of said first and second ranges are being executed and not accumulating time measurement by means of said counter when instructions having addresses not in said selected range are being executed.

19. A method of measuring execution of a plurality of instructions from a plurality of addresses in a memory by means of a processor, said method comprising the steps of:
   a. selecting a first address limit number and a second address limit number;
   b. selecting either a first range including addresses between said first address limit number and said second address limit number, or a second range including addresses greater than said first address limit number and less than said second address limit number;
   c. transmitting a first address for an instruction to be executed from a first memory bus to a first comparator and a second comparator;
   d. comparing said first address with said first address limit number by means of said first comparator;
   e. comparing said first address with said second address limit number by means of said second comparator;
   f. producing a first signal in response to said comparing steps, said first signal indicating whether said first address is in said selected one of said first and second ranges;
   g. repeating said steps (c), (d), (e) and (f) for the corresponding addresses of said instructions to be executed; and h. counting the instructions having addresses in said selected range.

20. A method of measuring execution of a plurality of instructions from a plurality of addresses in a memory by means of a processor, said method comprising the steps of:
   a. selecting a first address limit number and a second address limit number;
   b. selecting either a first range including addresses between said first address limit number and said second address limit number, or a second range including addresses greater than said first address limit number and less than said second address limit number;
   c. transmitting a first address from a first memory bus to a first comparator and a second comparator;
   d. comparing said first address with said first address limit number by means of said first comparator;
   e. comparing said first address with said second address limit number by means of said second comparator;
   f. producing a first signal in response to said comparing steps, said first signal indicating whether said first address is in said selected one of said first and second ranges;
   g. measuring time during which said first signal indicates that said first address is in said selected one of said first and second ranges; and
   h. repeating said steps (c), (d), (e), (f) and (g) for additional other addresses of said plurality of instructions.

* * * * *